United States Patent

[11] 3,586,969

| | | | |
|---|---|---|---|
| [72] | Inventor | John A. Rudisill, Jr. Burlington, N.C. | |
| [21] | Appl. No. | 833,012 | |
| [22] | Filed | June 13, 1969 | |
| [45] | Patented | June 22, 1971 | |
| [73] | Assignee | Bell Telephone Laboratories, Incorporated Murray Hill, Berkeley Heights, N.J. | |

[54] SYSTEM AND METHOD FOR MEASURING A CIRCUIT'S STEP FUNCTION TIME RESPONSE
6 Claims, 14 Drawing Figs.

[52] U.S. Cl. .................................................... 324/57 R, 330/2
[51] Int. Cl. ........................................................ G01r 27/00

[50] Field of Search ........................................... 324/57, 57 A, 57 FP, 102, 77 A, 76, 57 NB, 158 T; 318/561, 565; 330/2

[56] References Cited
UNITED STATES PATENTS
2,685,062   7/1954   Schroeder et al. ............   324/57

*Primary Examiner*—Edward E. Kubasiewicz
*Attorneys*—R. J. Guenther and William L. Keefauver ABSTRACT: A simple means for determining two values of the time response that a circuit under test would have to a unit step input is disclosed. The apparatus utilizes the frequency response of the circuit to provide this time response information, thus eliminating the usual requirement that the testing circuitry have a faster response time than the circuit being tested.

PATENTED JUN22 1971 3,586,969

INVENTOR
J. A. RUDISILL, JR.
BY
ATTORNEY

SYSTEM AND METHOD FOR MEASURING A CIRCUIT'S STEP FUNCTION TIME RESPONSE

GOVERNMENT CONTRACT

The invention herein claimed was made in the course of, or under contract with the Department of the Army.

FIELD OF THE INVENTION

This invention relates to apparatus for testing the transient response characteristics of electrical circuits.

BACKGROUND OF THE INVENTION

An important characteristic of many electrical circuits is their ability to respond to sudden changes in the wave shape of an input signal. This characteristic, commonly called the transient response of the circuit, is of particular concern in amplifiers and feedback control systems. The transient response of an amplifier is a measure of its ability to provide distortion-free amplification. The transient response of a feedback control system provides information concerning the response time of the system, the maximum deviation of the actual output from the desired output, and the frequency of transient oscillations occurring in the output.

In view of the importance of a circuit's transient response, it would be desirable to determine the transient response by applying the types of transient input signals that the circuit will encounter in its intended application. However, the input transients that will occur in a given circuit or system are often random in nature and are difficult to predict. The common practice, therefore, is to evaluate a circuit by considering its response to certain standard inputs. One of the most commonly used of these standard inputs is the unit step function.

An obvious way of determining the step function time response is to apply a step function to the circuit and observe the resulting output on an oscilloscope. As is well known, this method requires that the test equipment have a faster response time than the circuit being tested. In fact, as a common rule of thumb, test equipment four to 10 times faster than the circuit to be measured should be used. However, using test equipment that is "too fast" for the particular measurement being made can be detrimental. For example using a step input more than 10 times faster than the rise time of the circuit being tested may result in errors due to the waveform used.

The direct application of a test input to the circuit yields the entire transient response, but this becomes more difficult to implement for circuits or systems having a very fast response time. The determination of the entire transient response is often unnecessary. In many situations limited time response testing, involving the determination of a few particular points on the transient response curve, would provide sufficient information concerning the circuits performance.

For example, the most frequently encountered feedback control systems, amplifiers, and filters have a damping factor such that the frequency response has the general form shown in FIG. 1. As is well known, a circuit with this type of frequency response has a time response to a unit step input that is measured from the application of the input and that has the form shown in FIG. 2. Further, the time response shown in FIG. 2 is usually characterized by two time values, the peak response time and the duplicating time, and the natural resonant frequency.

The peak response time, shown as $t_p$ in FIG. 2, is the time required for the normal response to a unit step input to reach its first maximum.

The duplicating time, shown as $t_o$ in FIG. 2, is the time required for the normal response to a unit step input to reach the final steady state value for the first time. The normal testing procedure usually involves the measurement of the rise time rather than the duplicating time. The rise time, shown as $t_r$ in FIG. 2, is usually defined as the time required for the normal response to a unit step input to increase from 10 percent of the final value to 90 percent of the final value. The rise time is normally used because of the ease with which it can be measured on an oscilloscope. However, the duplicating time is a more accurate measure of the circuit's performance.

A simple means of limited time response testing, wherein only the peak response time and the duplicating time are determined, would be very useful, One possible use of this type of testing is in the production line testing of circuits. Here the circuit design has been thoroughly analyzed and tested on prototypes, and the concern is whether the particular mass-produced circuit being tested has been properly constructed. A key requirement in the testing of these circuits is that the tests be performed in the simplest possible manner so as to minimize the cost of the test, the skill required to perform the test, and the chances of error in conducting the test. A testing method that provides a trade-off of the redundant information contained in a complete time response curve for increased ease of testing would particularly fulfill this requirement.

Accordingly, it is an object of this invention to provide a simplified means for determining the duplicating time and peak response time of a circuit.

Specifically, it is an object of this invention to utilize the frequency response characteristics of the circuit in the determination of these time response values, thus eliminating any requirements as to the response time of the test equipment.

SUMMARY OF THE INVENTION

In accordance with the present invention, these objects are achieved by applying a sweep frequency signal to the circuit under test, continuously subtracting the magnitude of the resultant output from the magnitude of the input, and integrating the results of the continuous subtraction until a null occurs. The value of frequency in radians per second at which the null occurs, when divided into $2\pi$, represents the peak response time when the magnitude of the input signal is constant, and the duplicating time when the magnitude of the input signal varies inversely with frequency.

DETAILED DESCRIPTION

Figure 1:
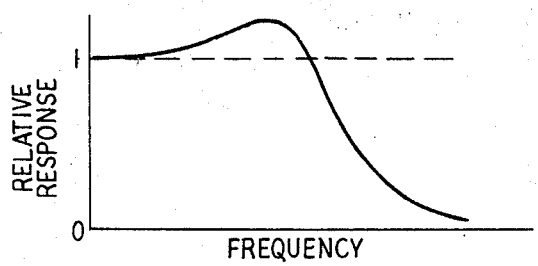
FIG. 1 shows the form of the frequency response of a typical amplifier or feedback control system.
Figure 2:
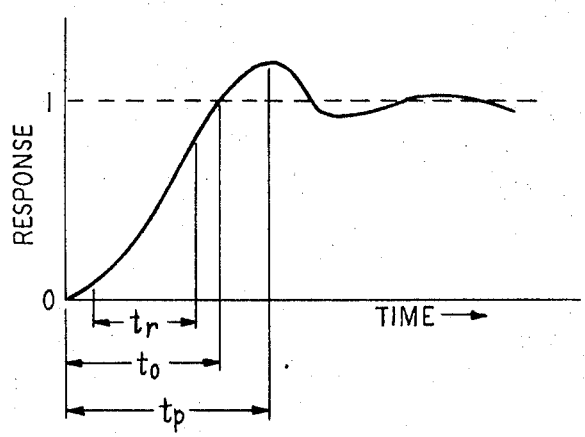
FIG. 2 shows the form of the time response to a unit step input of a circuit having a frequency response as depicted in FIG. 1.

It is well known that the time domain characteristics of a signal are related to the frequency domain characteristics by the Fourier transform. The manner in which the present invention uses the frequency response of a circuit to provide information concerning the circuit's time response can be seen by considering the following application of the Fourier transform.

The Fourier transform of a function of time $f(t)$ is given by $$F(f(t)) = F(w) = \int_{-\infty}^{\infty} f(t) e^{-jwt} dw \quad (1)$$

and the inverse Fourier transform is given by $$F^{-1}(F(w)) = f(t) = \frac{1}{2\pi} \int_{-\infty}^{\infty} F(w) e^{jwt} dw \quad (2)$$

Since an expression for the time response in terms of the frequency response is desired, equation (2), which is a general expression for the time response, is used.

Substituting $$F(w) = E(w)e^{j\phi(w)} \quad (3)$$

into equation (2) gives $$f(t) = \frac{1}{2\pi}\int_{-\infty}^{\infty} E(w)e^{j(wt-\phi)}dw \quad (4)$$

Consider a particular value of $t$, for example $T$. Then equation (4) becomes $$f(T) = \frac{1}{2\pi}\int_{-\infty}^{\infty} E(w)e^{j(wT-\phi)}dw \quad (5)$$

Substituting $$\theta = wT + \Phi \quad (6)$$

into equation (5) gives $$f(T) = \frac{1}{2\pi}\int_{-\infty}^{\infty} E(w)e^{j\theta}dw \quad (7)$$

Equation (7) may then be expressed as the sum of three integrals $$f(T) = \frac{1}{2\pi}\int_{-\infty}^{-w_0} E(w)e^{j\theta}dw + \frac{1}{2\pi}\int_{-w_0}^{w_0} E(w)e^{j\theta}dw$$
$$+ \frac{1}{2\pi}\int_{w_0}^{\infty} E(w)e^{j\theta}dw \quad (8)$$

Next the well-known Jordan's lemma is applied to equation (8). Jordan's lemma states:

If $G(w)$ is analytic (i.e., can be represented by a convergent power series throughout a neighborhood where $w$ equal a constant) in the upper half plane, except possibly for a finite number of poles, and tends uniformly to zero as the value of $w$ approaches infinity with the imaginary part of $G(w)$ equal to or greater than zero, then for every real number $k$ $$\lim_{R \to \infty} \int_c G(w)e^{jkw}dw = 0 \quad (9)$$

$R$ in this formula is the real axis value of $w$.

Thus the first and third integrals in equation (8) are found to be zero, leaving $$f(T) = \frac{1}{2\pi}\int_{-w_0}^{w_0} E(w)e^{j\theta}dw \quad (10)$$

Equation (10) can be simplified by using the well-known series expansion of $e$:

$$e^{j\theta} = 1 + j\theta - \frac{\theta^2}{2!} - \frac{j\theta^3}{3!} + \frac{\theta^4}{4!} + \frac{j\theta^5}{5!} - \frac{\theta^6}{6!} - \cdots \quad (11)$$

Substituting equation (11) into equation (10) gives $$f(T) = \frac{1}{2\pi}\left\{\int_{-w_0}^{w_0} E(w)dw + j\int_{-w_0}^{w_0} E(w)\theta dw\right.$$
$$\left. - \frac{1}{2!}\int_{-w_0}^{w_0} E(w)\theta^2 dw - \cdots \right\} \quad (12)$$

Equation (12) can be readily simplified since, for all circuits that can actually be physically realized, the frequency characteristic $E(w)$ will be an even function of $w$ and $\theta$ will be an odd function of $w$, therefore all odd terms are zero and equation (12) reduces to $$f(t) = \frac{1}{2\pi}\int_{-w_0}^{w_0} E(w)dw$$
$$+ \int_{-w_0}^{w_0}\left(-\frac{\theta^2}{2!} + \frac{\theta^4}{4!} - \frac{\theta^6}{6!} + \cdots\right)E(w)dw \quad (13)$$

Substituting the identity $$\cos\theta - 1 = -\frac{\theta^2}{2!} + \frac{\theta^4}{4!} - \frac{\theta^6}{6!} + \cdots \quad (14)$$

gives $$f(T) = \frac{1}{2\pi}\int_{-w_0}^{w_0} E(w)dw + \frac{1}{2\pi}\int_{-w_0}^{w_0}(\cos\theta - 1)E(w)dw \quad (15)$$

which in turn simplifies to $$f(T) = \frac{1}{2\pi}\int_{-w_0}^{w_0} E(w)\cos\theta dw \quad (16)$$

Equation (16) is the value of the time response at a particular time, $T$, expressed in terms of a generalized frequency function representative of a circuit's behavior in a particular portion of the frequency domain when a unit step input is applied. The present invention advantageously employs a judicious selection of a particular frequency function $E(w)$, and a particular frequency band, $w_o$ for use in connection with a system for testing a circuit.

Figure 3:
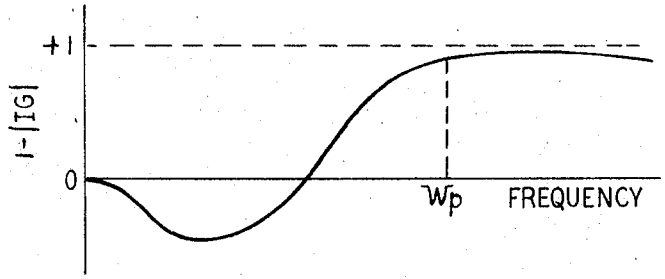
FIG. 3 shows the manner in which the insertion gain of a circuit having a frequency response as depicted in FIG. 1 varies with frequency.
Figure 4:
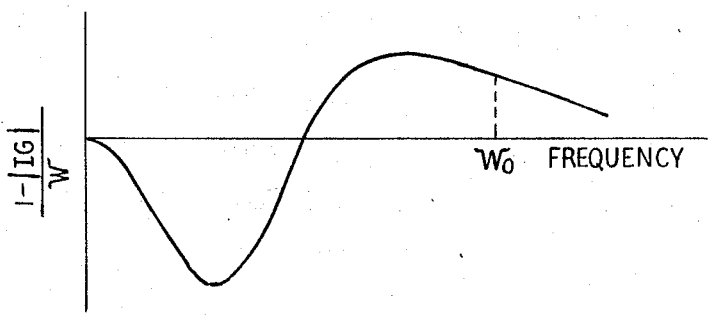
FIG. 4 shows the variation of a circuit's error function with frequency.

The particular function selected is the output error function defined as $$E = \text{Output Error Function} = \text{Input} - \text{Output} \quad (17)$$

and is calculated in the frequency domain. As is well known from Laplace transform theory, the Laplace transform representation of the output of a circuit is equal to the frequency domain representation of its input times its transfer function. The transfer function of a circuit having a frequency response like that shown in FIG. 1 is thus expressed as $IG$, and commonly termed the insertion gain. For a unit step function input, equation (17) evaluated in the frequency domain is $$E = \frac{1}{s} - \frac{1}{s}(IG) = \frac{(1-IG)}{s} \quad (18)$$

where $1/s$ is the transform of the unit step input and $s$ is the transform variable. The magnitude of the insertion gain varies with frequency in the same manner as the relative response shown in FIG. 1, and hence $1 - IG$ has the form shown in FIG. 3. Since the "$s$" in equation (18) represents frequency, ($jw$), the magnitude of the error function used in equation (16) for the type of circuit under discussion has the form shown in FIG. 4.

The angle $\theta$, as defined previously in equation (6), must also be interpreted in terms of the error function for a unit step input. This is done by letting $\Phi$ be the output error angle. The output phase angle for the types of circuit under consideration here would be, ideally, 180°. The output error angle is thus $$\Phi = 180° - \pi/2 - \arg(IG) = 90° - \arg(IG) \quad (19)$$

where the term $-\pi/2$ is due to the $1/s$ term in equation (18) and the term $-\arg(IG)$ represents the circuit's deviation from the ideal.

This interpretation of equation (16) leads to the following important result. The integral in equation (16) will be zero when $T$ equals the duplicating time. This follows directly from the above definition of duplicating time since there is zero difference, or error, between the desired output and the actual output at this time. The value of $w_o$ which makes equation (16) equal to zero can then be converted to the value of the duplicating time by dividing it into $2\pi$, that is, $$t_0 = \frac{2\pi}{w_0} \quad (20)$$

Although equation (16) yields the exact value of $w_o$, it is difficult to implement practically. This difficulty may be solved by the recognition that integrating only the magnitude of the error function rather than the error function multiplied by $\cos\theta$ will give substantially the same result.

Figure 5A:
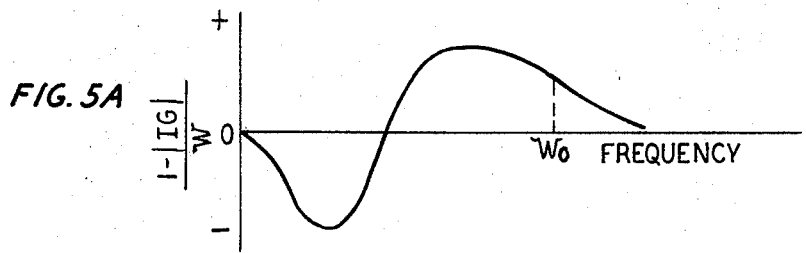
FIG. 5A to 5H are used to illustrate certain mathematical aspects of the present invention.
Figure 5B:
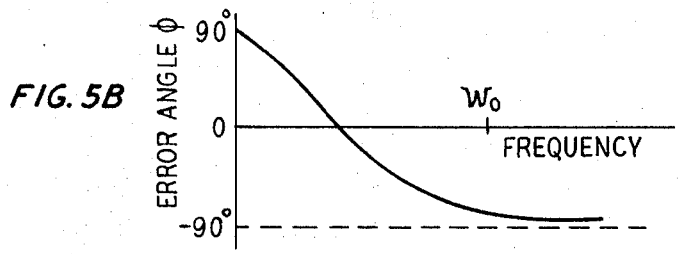
Figure 5C:
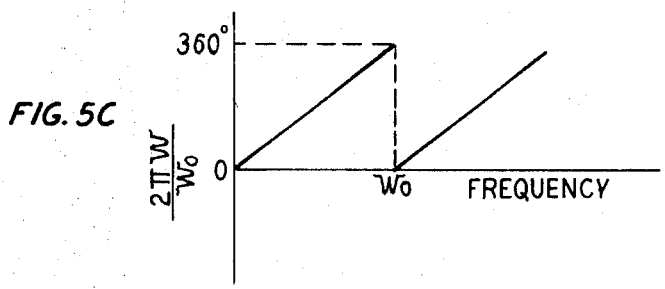
Figure 5D:
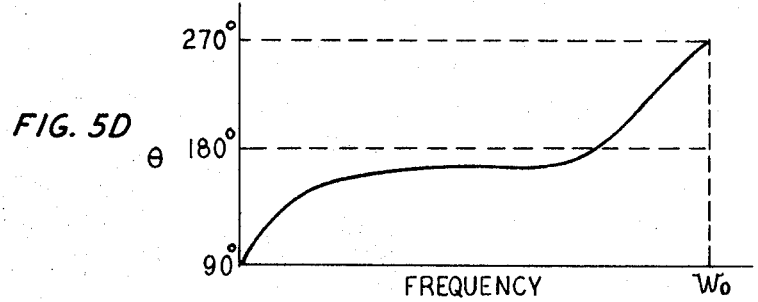
Figure 5E:
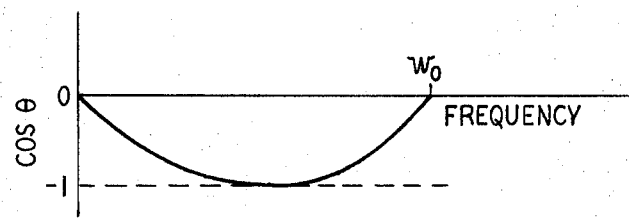
Figure 5F:
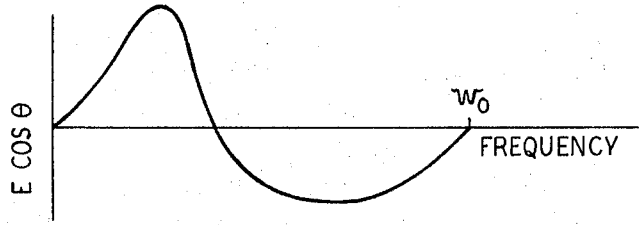

Typical plots for the error function of equation (18) and the error angle of equation (19) are shown in FIGS. 5A and 5B, respectively. Letting $T = 2\pi/w_o$, FIG. 5C is a plot of $wT$, that is $2\pi w/w_o$, showing it to be a linear function of frequency. FIG. 5D is a combination of FIGS. 5B and 5C in accordance with equation (6) and represents the manner in which $\theta$ varies with frequency. Using the values of FIG. 5D, the value of cosine $\theta$ is shown to be as in FIG. 5E. The value of $E\cos\theta$ is thus the product of the curves of FIGS. 5A and 5E and is as shown in FIG. 5F. Finally, FIG. 5G is a superposition of FIGS. 5A and 5F.

Figure 5G:
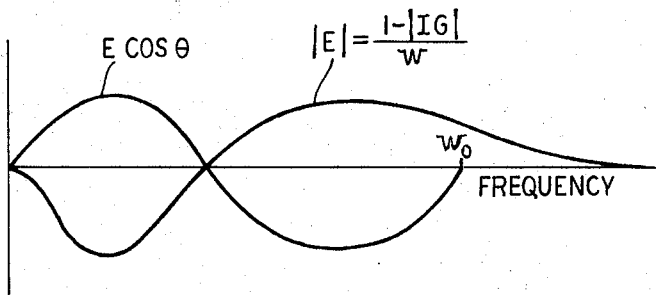

FIG. 5G shows that the negative and positive values of $E\cos\theta$ are respectively smaller than $|E|$ such that when the integral of $|E|$ is set equal to zero the integral of $E\cos\theta$ also very closely approximates zero over the frequency range of zero to $w_o$. The duplicating time, $t_o$, is now seen to be determinable by integrating the error function of equation (18).

The error function shown in equation (18) is also the basis for the determination of the peak response time. The peak response time expressed in terms of the error function is merely the maximum value of the error function, and differentiating the error function and setting it equal to zero provides a representation in the frequency domain of the peak response time. Differentiation in the frequency domain is mathematically equivalent to multiplication by $s$, so that equation (18) becomes $E=1a/IG$. The integration of the differentiated error function over a frequency range of zero to $w_p$ provides the desired measure of the peak response time, $t_p$. Thus $$t_p = \frac{2\pi}{w_p} \quad (21)$$

Figure 5H:
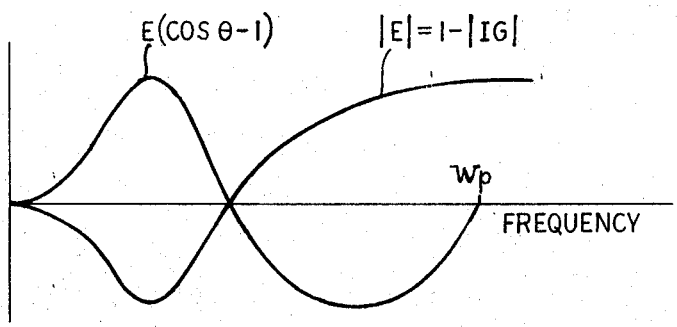

$\Phi$ for this case becomes $180°-$ arg (16). Since $\cos \theta$ will be zero over a large portion of the frequency range of interest, it is best to work with equation (15) and thus to employ ($\cos \theta - 1$) which has a value near $-1$ over the desired range. FIG. 5H indicates the manner in which the integral of $E (\cos \theta - 1)$ closely approximates the integral of $|E|$ for this case. Equation (15) may thus be rewritten for this case as $$f(t_p) = \frac{1}{2\pi}\int_{-w_p}^{w_p} E(w)dw + \frac{1}{2\pi}\int_{-w_p}^{w_p} E(\cos\theta - 1)dw \quad (22)$$

Figure 6:
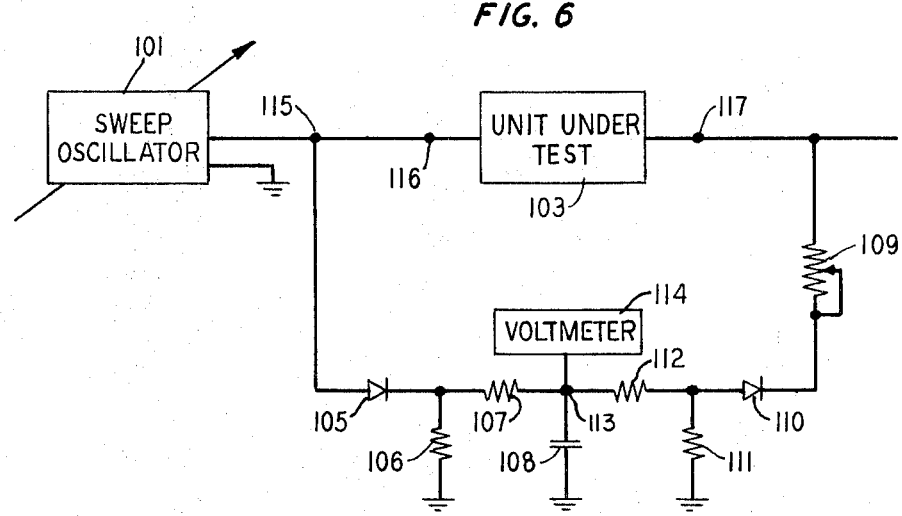
FIG. 6 shows an embodiment of a circuit used to practice a part of the invention.

FIG. 6 shows the apparatus required to implement the integration of the error functions. Sweep oscillator 101 is used to provide a constant magnitude sinusoidal signal that continually varies in frequency in the manner shown generally in FIG. 5C, but where the variation is between a lower and an upper limit, both of which may be set at any desired frequency. A limited frequency sweep is sufficient for most applications. A particular example of an appropriate sweep oscillator is the Model 3300 A Function Generator manufactured by the Hewlett Packard Company. This instrument, with the aid of appropriate plug-in units available from the same company can cover a frequency range from 0.00005 Hz. to 40 GHz.

The peak response time is determined by applying the output signal from the sweep oscillator 101 to the unit under test 103 and to the half-wave rectification circuit composed of diode 105 and resistor 106. The rectified signal is then applied to the integration circuit composed of resistor 107 and capacitor 108.

The output signal from the unit under test is applied to the negative half-wave rectification circuit composed of diode 110 and resistor 111 through potentiometer 109. Potentiometer 109 is used to normalize the output signal. The negatively rectified output signal is then applied to the integration circuit composed of resistor 112 and capacitor 108. The use of capacitor 108 in the integration of both the magnitude of the input signal and the negative magnitude of the output signal serves to generate at point 113 the integral of the sum of the input and output signals which is, in effect, the value of $1 - |IG|$. Voltmeter 114 provides a visual indication of the value of the integral formed.

Proper operation of the circuit of FIG. 6 requires that the time constant of the integration circuit be large with respect to the sweep rate of the oscillator 101. Typically, the time constant $T$ would be chosen to be 10 times the time of the sweep rate. $T$ is determined as follows:

$$T = R_{eq} C \quad (23)$$

where $R_{eq}$ is the parallel resistance value of resistors 106 plus 107 and 111 plus 112, and $C$ is the capacitance value of capacitor 108.

The peak response time of a unit under test is found, as indicated by equation (22), by advancing the upper bound of the sweep frequency range until the voltmeter 114 reads zero. The value of frequency at which this occurs, corresponding to $w_p$ in equation (22), divided into $2\pi$ is the value of the peak response time of the circuit as shown in equation (21). It should be noted that the frequency only need be swept over the range over which the $E$ function is not zero.

When the value of the peak response time is known, as in production line testing of mass produced circuits, the test circuit can be used to provide a rapid and accurate indication of whether each unit tested has the desired peak response time. In this mode of operation terminals 116 and 117 can be easily designed to allow rapid connection and disconnection of units to be tested. The upper bound of the sweep oscillator can be set to the correct value. A "go-no go" test then comprises inserting a unit into test terminals 116 and 117 and checking voltmeter 114 for a zero reading.

Figure 7:
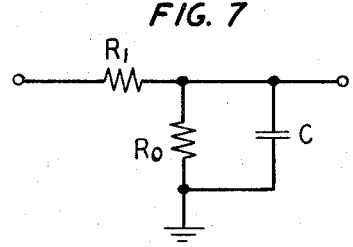
FIG. 7 shows an embodiment of a circuit that may be added to the circuit of FIG. 6 to practice another portion of the invention.

The duplicating time of a circuit may be similarly determined. This, however, requires the insertion of the circuit shown in FIG. 7 between node 115 and the sweep oscillator 101 shown in FIG. 6. Equation (18) shows that the magnitude of the input signal used to determine the duplicating time must vary inversely with frequency. The circuit of FIG. 7 can be used to provide this variation over the limited frequency band for which the $E$ function is not zero. The limits of this frequency band are used to set the value of resistors $R_i$ and $R_o$ and capacitor $C$ shown in FIG. 7. If $w_1$ is the lower limit and $w_2$ the upper limit of the frequency band, then $R_i$, $R_o$, and $C$ must be chosen to satisfy equations (24).

$$w_1 = \frac{1}{(R_0 + R_i)C}$$

$$w_2 = \frac{1}{R_0 C} \quad (24)$$

What I claim is:

1. Apparatus for determining the duplicating time of an electrical circuit expressed as a value of frequency comprising:

means for applying to said electrical circuit an electrical signal that continuously varies in frequency from a lower value to an upper value and in magnitude inversely with the frequency;

means for continuously subtracting the magnitude of said applied signal from the magnitude of the output signal of said electrical circuit generated in response to said applied signal;

means for accumulating the sum of the results of said subtraction;

means for detecting a null in said sum; and means for adjusting said upper frequency limit until a null occurs, thereby establishing the desired frequency value.

2. Apparatus for determining the peak response time of an electrical circuit expressed as a value of frequency comprising;

means for applying to said electrical circuit an electrical signal that continuously varies in frequency from a lower value to an upper value;

means for continuously subtracting the magnitude of said applied signal from the magnitude of the output signal of said electrical circuit generated in response to said applied signal;

means for accumulating the sum of the results of said subtraction;

means for detecting a null in said sum; and means for adjusting said upper frequency limit until a null occurs, thereby establishing the desired frequency value.

3. The method of determining the duplicating time of an electrical circuit comprising the steps of:

generating an electrical signal that continuously varies in frequency from a lower limit to an upper limit and in magnitude inversely with the frequency;

applying said signal to said electrical circuit;

subtracting the magnitude of said applied signal from the magnitude of the output signal of said electrical circuit generated in response to said applied signal accumulating the sum of the results of said subtraction;

adjusting said upper limit of frequency until a null occurs in said sum; and dividing the value of the upper limit of frequency at which said null occurs into $2\pi$.

4. The method of determining the peak response time of an electrical circuit comprising the steps of;

generating an electrical signal that continuously varies in frequency from a lower limit to an upper limit;

applying said signal to said electrical circuit;

subtracting the magnitude of said applied signal from the magnitude of the output signal of said electrical circuit generated in response to said applied signal;

accumulating the sum of the results of said subtraction;

adjusting said upper limit of frequency until a null occurs in said sum; and dividing the value of the upper limit of frequency at which said null occurs into $2\pi$.

5. The method of determining a representation of the duplicating time of an electrical circuit expressed as a frequency value comprising the steps of:

generating an electrical signal that continuously varies in frequency from a lower limit to an upper limit and in magnitude inversely with the frequency;

applying said signal to said electrical circuit;

subtracting the magnitude of said applied signal from the magnitude of the output signal of said electrical circuit generated in response to said applied signal accumulating the sum of the results of said subtraction; and adjusting said upper limit of frequency until a particular value of frequency is reached whereat a null occurs in said sum of results, said particular value of frequency being the desired representation of said duplicating time.

6. The method of determining a representation of the peak response time of an electrical circuit expressed as a frequency value comprising the steps of:

generating an electrical signal that continuously varies in frequency from a lower limit to an upper limit;

applying said signal to said electrical circuit;

subtracting the magnitude of said applied signal from the magnitude of the output signal of said electrical circuit generated in response to said applied signal;

accumulating the sum of the results of said subtraction; and adjusting said upper limit of frequency until a particular value of frequency is reached whereat a null occurs in said sum of results, said particular value of frequency being the desired representation of said peak response time.